US008488571B2

(12) United States Patent
Nandagopal et al.

(10) Patent No.: US 8,488,571 B2
(45) Date of Patent: Jul. 16, 2013

(54) METHOD AND APPARATUS FOR MANAGING AN IP ADDRESS SPACE OF AN ADDRESS SERVER IN A MOBILITY NETWORK

(75) Inventors: Thyagarajan Nandagopal, Edison, NJ (US); Thomas Y. Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 930 days.

(21) Appl. No.: 11/946,396

(22) Filed: Nov. 28, 2007

(65) Prior Publication Data

US 2009/0135793 A1    May 28, 2009

(51) Int. Cl.
*H04Q 7/20* (2006.01)
*H04L 12/56* (2006.01)

(52) U.S. Cl.
USPC ........................................ 370/338; 370/400

(58) Field of Classification Search
USPC ................ 370/310, 328, 329, 331, 338, 351, 370/389, 400; 709/223, 226
See application file for complete search history.

(56) References Cited

U.S. PATENT DOCUMENTS

| 6,295,594 | B1 | 9/2001 | Meier | |
|---|---|---|---|---|
| 6,434,134 | B1 * | 8/2002 | La Porta et al. | 370/338 |
| 6,603,763 | B1 * | 8/2003 | Koshino | 370/389 |
| 6,662,287 | B1 | 12/2003 | Andreev et al. | |
| 6,690,659 | B1 * | 2/2004 | Ahmed et al. | 370/328 |
| 6,795,709 | B2 * | 9/2004 | Agrawal et al. | 455/452.1 |
| 6,865,613 | B1 * | 3/2005 | Millet et al. | 709/245 |
| 7,016,324 | B2 * | 3/2006 | Agrawal et al. | 370/331 |
| 7,016,353 | B2 * | 3/2006 | Proctor et al. | 370/392 |
| 7,051,056 | B2 | 5/2006 | Rodriguez-Rivera et al. | |
| 7,103,648 | B1 * | 9/2006 | Burrows | 709/220 |
| 7,151,758 | B2 * | 12/2006 | Kumaki et al. | 370/331 |
| 7,330,907 | B2 | 2/2008 | Boylan et al. | |
| 7,421,499 | B1 * | 9/2008 | Lanahan et al. | 709/226 |
| 7,461,169 | B2 * | 12/2008 | Chandra et al. | 709/245 |
| 7,573,846 | B2 * | 8/2009 | Rue et al. | 370/329 |
| 7,729,366 | B2 * | 6/2010 | Mok et al. | 370/401 |
| 7,808,942 | B2 * | 10/2010 | Bui et al. | 370/310.2 |
| 7,808,970 | B2 * | 10/2010 | Narayanan et al. | 370/351 |
| 2002/0032766 | A1 * | 3/2002 | Xu | 709/223 |
| 2002/0035699 | A1 * | 3/2002 | Crosbie | 713/201 |
| 2002/0136226 | A1 * | 9/2002 | Christoffel et al. | 370/401 |
| 2002/0144073 | A1 | 10/2002 | Trainin et al. | |
| 2002/0193114 | A1 * | 12/2002 | Agrawal et al. | 455/442 |

(Continued)

FOREIGN PATENT DOCUMENTS

WO    WO 2009/078028 A1    6/2009

*Primary Examiner* — Chi Pham
*Assistant Examiner* — Robert Lopata
(74) *Attorney, Agent, or Firm* — Wall & Tong, LLP

(57) ABSTRACT

The invention manages an IP address space in a mobility network, including partitioning of the IP address space, assignment of IP addresses from the IP address space, and/or use of hysteresis to control reassignment of IP addresses from the IP address space. The IP address assignment is performed using one or more residual time statistics from a residual time profile maintained for the mobile node requesting assignment of an IP address. A residual time profile of a mobile node includes one or more residual time statistics associated with the mobile node. The residual time statistics for a mobile node are determined using a residual time associated with each IP address assigned to the mobile node. The IP address space partitioning is performed using residual time statistics maintained for mobile nodes of the network. The reassignment of IP addresses from the IP address space is controlled using hysteresis.

18 Claims, 5 Drawing Sheets

U.S. PATENT DOCUMENTS

| | | | |
|---|---|---|---|
| 2003/0045287 A1* | 3/2003 | Taniguchi | 455/433 |
| 2003/0163584 A1* | 8/2003 | Anderson et al. | 709/245 |
| 2003/0163620 A1 | 8/2003 | Minami et al. | |
| 2004/0004967 A1* | 1/2004 | Nakatsugawa et al. | 370/400 |
| 2007/0061484 A1* | 3/2007 | Droms et al. | 709/245 |
| 2007/0180120 A1 | 8/2007 | Bainbridge et al. | |
| 2007/0230468 A1 | 10/2007 | Narayanan et al. | |
| 2007/0280149 A1* | 12/2007 | Takahashi et al. | 370/328 |
| 2008/0159289 A1 | 7/2008 | Narayanan et al. | |
| 2008/0259933 A1 | 10/2008 | Okada et al. | |
| 2008/0313709 A1* | 12/2008 | Shirota et al. | 726/3 |
| 2009/0006596 A1 | 1/2009 | Dinakaran et al. | |

* cited by examiner

METHOD AND APPARATUS FOR MANAGING AN IP ADDRESS SPACE OF AN ADDRESS SERVER IN A MOBILITY NETWORK

FIELD OF THE INVENTION

The invention relates to the field of communication networks and, more specifically, to address assignment in mobile networks.

BACKGROUND OF THE INVENTION

In a mobile network, mobile nodes (MNs) can request dynamic home IP address assignment, based on their Network Access Identifiers (NAIs). When a new MN registers with the network, a home IP address is assigned to the MN and a routing entry is created in the routing/forwarding table in order to assign the appropriate route for any packets destined to the MN. When a MN leaves the network (e.g., deregisters or expires), the home IP address of the MN is released and the associated routing entry is removed from the routing/forwarding table. The routing entry points to an outgoing/destination interface to which packets are sent.

Due to the dynamic nature of mobile networks, MNs are continuously entering the network and leaving the network, and, thus, IP addresses are continuously being assigned and released for the MNs. Furthermore, MNs may use assigned IP addresses for any length of time (i.e., assigned IP addresses may be short-lived or may be long-lived). Disadvantageously, however, in IP address assignment schemes utilizing address aggregation techniques to reduce the size of the routing/forwarding table, assignment of IP addresses to transient MNs ultimately results in an increase in the size of the routing/forwarding table.

SUMMARY OF THE INVENTION

Various deficiencies in the prior art are addressed through the present invention managing an IP address space in a mobility network, including partitioning of the IP address space, assignment of IP addresses from the IP address space, and/or use of hysteresis to control reassignment of IP addresses from the IP address space. The IP address assignment is performed using one or more residual time statistics from a residual time profile maintained for the mobile node requesting assignment of an IP address. A residual time profile of a mobile node includes one or more residual time statistics associated with the mobile node. The residual time statistics for a mobile node are determined using a residual time associated with each IP address assigned to the mobile node. The IP address space partitioning is performed using residual time statistics maintained for mobile nodes of the network. The reassignment of IP addresses from the IP address space is controlled using hysteresis.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides IP address space partitioning functions and IP address assignment functions using residual time statistics associated with mobile nodes of a mobility network, thereby improving stability of the IP address space. The present invention also provides a hysteresis adaptation function for preventing in-transit packets from being delivered to the wrong mobile node when an IP address is released from one mobile node and immediately reassigned to another mobile node.

Figure 1:
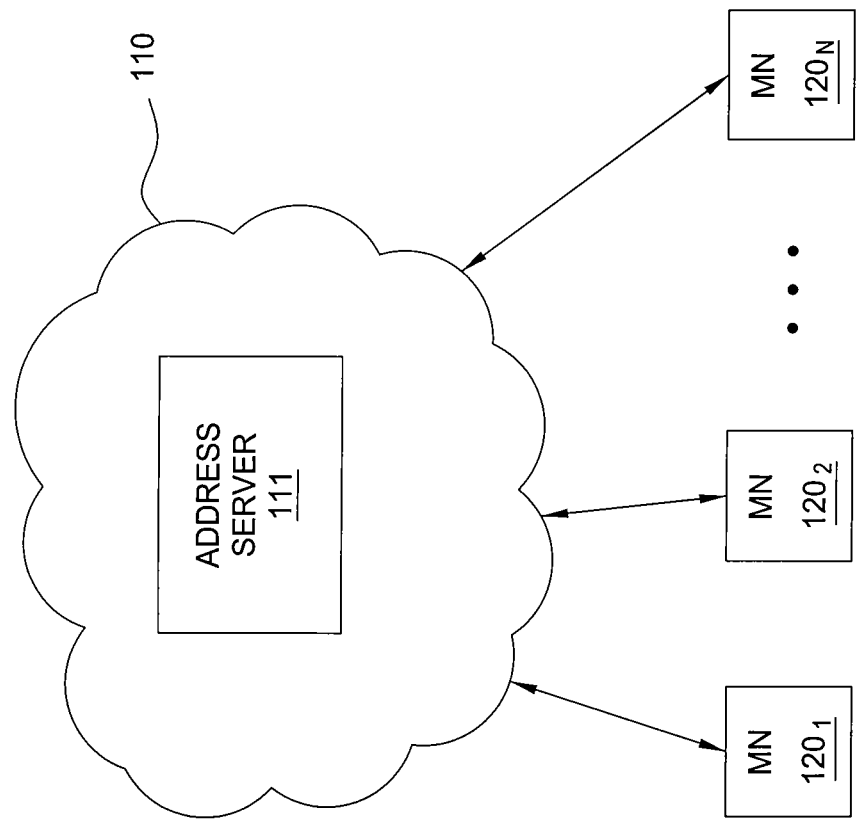
FIG. 1 depicts a high-level block diagram of a communication network architecture.

FIG. 1 depicts a high-level block diagram of a communication network architecture. Specifically, communication network architecture 100 includes a communication network (CN) 110 adapted for supporting communications for mobile nodes (illustratively, for a plurality of mobile nodes (MNs) $120_1$-$120_N$ (collectively, MNs 120)).

The CN 110 may include any IP-based network, such as the Internet or any other packet-based network utilizing IP. The CN 110 may support any mobility protocol, such as Mobile IP or any similar protocol that enables mobile nodes to roam while maintaining a permanent IP address. The CN 110 includes various routers, switches, and the like for routing information for MNs 120. The CN 110 includes servers and other network elements adapted for providing services to MNs 120.

The MNs 120 include mobile nodes capable of communicating over a packet-based network (illustratively, CN 110). The MNs 120 communicate over CN 110 for accessing and utilizing various services, such as voice services, data services, video services, multimedia services, and the like, as well as various combinations thereof. For example, MNs 120 may include laptops, mobile phones, and the like. For purposes of the functions of the present invention, each of the MNs 120 may be identified in a number of different ways, e.g., by its name, Network Address Identifier (NAI), or International Mobile Subscriber Identity (IMSI), or in any other manner for identifying a mobile node.

The CN 110 includes an address server (AS) 111. The AS 111 manages IP addresses for CN 110, performing IP address management functions for MNs 102. The AS 111 assigns IP addresses to MNs 120 when they join the network and releases IP addresses from MNs 120 when they leave the network. The AS 111 is adapted to perform other functions, as described herein. For example, AS 111 may be a Home Agent (HA), an Authentication, Authorization, Accounting (AAA) server, a Dynamic Host Configuration Protocol (DHCP) server, or some similar address server.

The AS 111 performs partitioning of an IP address space. The AS 111 performs assignment of IP addresses. The AS 111 performs IP address space partitioning and IP address assignment by monitoring IP address management for MNs 120 in order to maintain respective residual time profiles for MNs 120, where the residual time profile of a MN 120 is indicative of usage of IP addresses by that MN 120. The AS 111 also performs a hysteresis adaptation function. The operation of AS 111 in performing various functions of the present invention may be better understood with respect to FIG. 2-FIG. 4.

Figure 2:
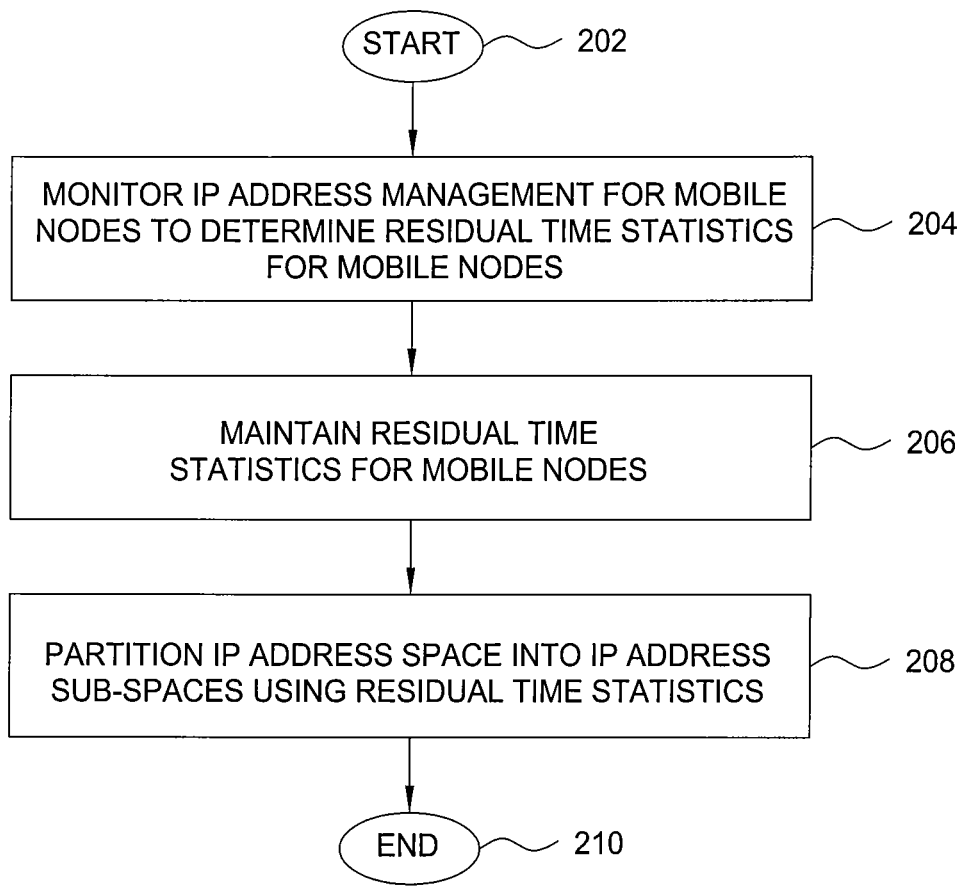
FIG. 2 depicts a method according to one embodiment of the present invention.

FIG. 2 depicts a method according to one embodiment of the present invention. Specifically, method 200 of FIG. 2 includes a method for partitioning an IP address space based on residual time profiles of mobile nodes associated with the network. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, management of IP addresses for mobile nodes is monitored. The monitoring of IP address management for mobile nodes includes monitoring assignment of IP addresses to mobile nodes and associated releases of IP addresses from mobile nodes. The monitoring is performed in a manner for determining residual time statistics for each of the mobile nodes. The residual time of a mobile node is an amount of time a single IP address assigned to the mobile node remains valid. Thus, the residual time for a mobile node is determined by monitoring each IP address that is assigned to the mobile node and released from the mobile node.

The residual time for a given IP address for a given mobile node may be determined in any manner. In one embodiment, for example, the address server may monitor the time at which the IP address is assigned and a time at which the IP address is released, and determine the resulting residual time. In another embodiment, for example, the address server may start a timer when the IP address is assigned and stop the timer when the IP address is released, and determine the resulting residual time. The residual time may be determined in various other ways.

The residual time determined for a mobile node may be used to determine one or more residual time statistics, which may be organized using residual time parameters, residual time categories, and the like, as well as various combinations thereof.

The residual time statistics for a mobile node may include one or more residual time parameters, such as an average residual time statistic, a minimum residual time statistic, a maximum residual time statistic, a residual time variance statistic, a residual time range statistic, and the like, as well as various combinations thereof. In one embodiment, residual time statistics for one or more of these residual time parameters may be maintained for the mobile node. In one embodiment, residual time statistics for one or more of these residual time parameters may be determined and maintained for one or more different categories of statistics for which residual times may be measured.

The residual time statistics for one or more of the residual time parameters may be categorized using various categories, such as the residual time per point of connection to the network (e.g., determined using a Foreign Agent identifier, Access Router identifier, or other similar information), the residual time for the period of time during which the IP address is requested/assigned (e.g., the time of day, the time of month, and the like), the residual time for the application (or set of applications) for which the IP address is used, and the like, as well as various combinations thereof. The residual time statistics may be categorized in various other categories.

For example, a residual time profile may include residual time statistics organized using combinations of residual time parameters and residual time categories, such as: (1) the average residual time, per day of the week, per point of connection to the network; (2) the average, minimum, and maximum residual times per application for which the IP address is used; (3) the average residual time, per hour of the day in which the IP address is requested, per application for which the IP address is used; (4) the minimum and maximum residual time per application for which the IP address is used; and the like, as well as various combinations thereof. Those skilled in the art will understand that the foregoing examples comprise but a few of the many different types of residual time statistics which may be collected and maintained.

At step 206, residual time statistics are maintained for the mobile nodes. In one embodiment, the residual time statistics for the mobile nodes are maintained by maintaining a residual time profile for each of the mobile nodes. The residual time profile for a mobile node may include any residual time statistics (e.g., residual time statistics organized according to any residual time parameters and, optionally, organized according to any residual time categories). The residual time profile for a mobile node may be updated, each time an IP address being used by the mobile node is released, by determining the residual time for the released IP address and applying the determined residual time to the residual time profile for the mobile node.

The residual time determined for an IP address for a mobile node may be applied to the residual time profile of the mobile node in a number of ways.

In one embodiment, each residual time (and any additional information associated with the residual time) may be used to update any residual time statistics stored as part of the residual time profile of the mobile node (which, depending on the parameters/categories of residual time statistics may result in none, some, or all of the residual time statistics being updated).

For example, where the residual time profile of the mobile node includes only an average residual time statistic for the mobile node, the average residual time for the mobile node is updated based on the latest residual time determined for the mobile node.

For example, where the residual time profile of the mobile node includes an average residual time statistic per point of connection to the network, the average residual time statistic for the given point of connection of the latest IP address is updated based on the latest residual time determined for the mobile node.

For example, where the residual time profile of the mobile node includes minimum and maximum residual time statistics per day of the week, the minimum or maximum residual time statistic for the given point of connection of the latest IP address may or may not be updated based on the latest residual time determined for the mobile node (i.e., depending on whether the latest residual time is a new minimum or maximum).

In one embodiment, each residual time may be stored as part of the residual time profile. In one such embodiment, additional information may be stored with each residual time stored in the residual time profile (e.g., information such as one or more parameters for which each residual time is maintained, one or more categories to which each residual time applies, and the like, as well as various combinations thereof, depending on the level of detail of information maintained in the residual time profile).

The residual time determined for a mobile node upon release of an IP address previously assigned to the mobile node may be applied to the residual time profile of the mobile node in various other ways.

At step 208, an IP address space is partitioned based on the residual time statistics of the mobile nodes. In one embodiment, in which the residual time statistics are maintained using residual time profiles, the IP address space is partitioned using the residual time statistics of the respective residual time profiles of the mobile nodes.

The IP address space may be partitioned into two or more IP address sub-spaces (also referred to herein as IP address space partitions). The IP address space may be partitioned based on any residual time statistics. In one embodiment, the IP address space may be partitioned based on the numbers of mobile nodes and/or percentages of mobile nodes having specific residual time statistics in their residual time profiles. The IP address space may be partitioned based on residual time profiles of mobile nodes in various other ways.

For example, the IP address space may be partitioned into two IP address sub-spaces based on the percentage of mobile nodes having an average residual time below a threshold T (denoted as short-lived mobile nodes) and the percentage of mobile nodes having an average residual time above threshold T (denoted as long-lived mobile nodes). For example, for an IP address space of 256 IP addresses, where 25% of the mobile nodes have residual time profiles indicative that the associated mobile nodes are, on average, short-lived mobile nodes, the IP address space of 256 addresses may be partitioned such that 64 of the 256 addresses belong to a first partition and 176 of the 256 addresses belong to a second partition.

For example, the IP address space may be partitioned into two IP address sub-spaces based on the number of mobile nodes having a minimum residual time below a threshold T (denoted as short-lived mobile nodes) and the number of mobile nodes having a minimum residual time above threshold T (denoted as long-lived mobile nodes). For example, for an IP address space of 256 IP addresses, where 100 mobile nodes have residual time profiles indicative that the associated mobile nodes are short-lived mobile nodes, the IP address space of 256 addresses may be partitioned such that 64 of the 256 addresses belong to a first partition (e.g., because we assume that not all 100 mobile nodes will request IP addresses at the same time) and 192 of the 256 addresses belong to a second partition.

For example, the IP address space may be partitioned into two IP address sub-spaces during one period of the day and may be partitioned into four IP address sub-spaces during another period of the day. For example, the IP address space may be partitioned into two IP address sub-spaces from 11:00 PM-5:00 AM (e.g., using one threshold value for distinguished short-lived mobile nodes from long-lived mobile nodes based on their average residual times) and the IP address space may be partitioned into four IP address sub-spaces from 5:00 AM-11:00 PM (e.g., using three different threshold values for distinguishing four different categories of mobile nodes based on their average residual times). The partitioning may be based on the number of mobile nodes or the percentage of mobile nodes having residual time profiles indicative of specific residual time characteristics.

As mobile nodes continue to enter and leave the network and, thus, request and release IP addresses, additional residual time statistics are collected, and the associated residual time profiles of the mobile nodes are updated. Thus, since the residual time profiles of the mobile nodes are continuously being updated, the IP address space may be partitioned dynamically with any frequency. For example, the IP address space may be partitioned periodically (e.g., once per hour, once per day, and the like) and/or aperiodically (e.g., in response to changes to residual time profiles of mobile nodes, based on changes to residual time profiles of mobile nodes that exceed one or more thresholds, and the like).

The partitioning of the IP address space using residual time profiles may be performed using some or all of the residual time profiles available at the address server.

In one embodiment, partitioning of the IP address space may be performed using all residual time profiles available at the address server.

In one embodiment, partitioning of the IP address space may be performed using a subset of the residual time profiles available at the address server. The subset of residual time profiles selected for use in partitioning the IP address space may be selected in any manner.

In one such embodiment, for example, a predetermined percentage of the available residual time profiles may be selected for use in partitioning the IP address space. In such embodiments, the residual time profiles may be selected randomly or selected using residual time statistics included within each of the available residual time profiles.

In another such embodiment, for example, partitioning of an IP address space may be performed using residual time profiles having at least a threshold amount of residual time information (e.g., a threshold amount of total information, a threshold amount of historical information, and the like, as well as various combinations thereof).

For example, partitioning of an IP address space may be performed using residual time profiles including at least X residual time statistics, using residual time profiles that have existed for at least X amount of time (e.g., one week, one month, and the like), and the like, as well as various combinations thereof. The threshold amount of residual time information may be measured in various other ways.

In another such embodiment, for example, partitioning of an IP address space may be performed using residual time profiles of mobile nodes active within the network, where the level of activity of a mobile node within the network may be measured based on one or more factors, such the number of times the mobile node accesses the network, the length of time since the mobile node last accessed the network, and the like, as well as various combinations thereof.

For example, partitioning of an IP address space may be performed using residual time profiles of mobile nodes which have utilized as least X IP addresses within the network (e.g., 10 IP addresses, 50 IP addresses, and the like), using residual time profiles of mobile nodes which have utilized at least X IP addresses (e.g., X=1, 2, . . . , n) within a certain period of time (e.g., within the last week, within the last month, and the like), and the like, as well as various combinations thereof.

In other words, the IP address space may be partitioned into any number of IP address sub-spaces (which may be of any size, e.g., in terms of the number of IP addresses included in the IP address sub-spaces) based on any combination of residual time parameters (and, optionally, residual time categories where such categorization is performed). The present invention is not intended to be limited to a particular number of IP address sub-spaces. The present invention is not intended to be limited to performing IP address space partitioning based on a specific combination of residual time parameters and/or categories. The present invention is not intended to be limited to IP address partitioning that is performed based on specific numbers of residual time profiles.

As described herein, an IP address may be assigned to a mobile node from a selected one of the IP address sub-spaces. The IP address sub-space from which the IP address is assigned may be selected based on the residual time profile of the mobile node and, optionally, also based on one or more characteristics of the request from the mobile node for the IP address (e.g., point of connection to the network, time of day of the request, and the like, as well as various combinations thereof). The assignment of an IP address to a mobile node from an IP address space partitioned according to method 200 of FIG. 2 may be better understood with respect to method 300 of FIG. 3.

Figure 3:
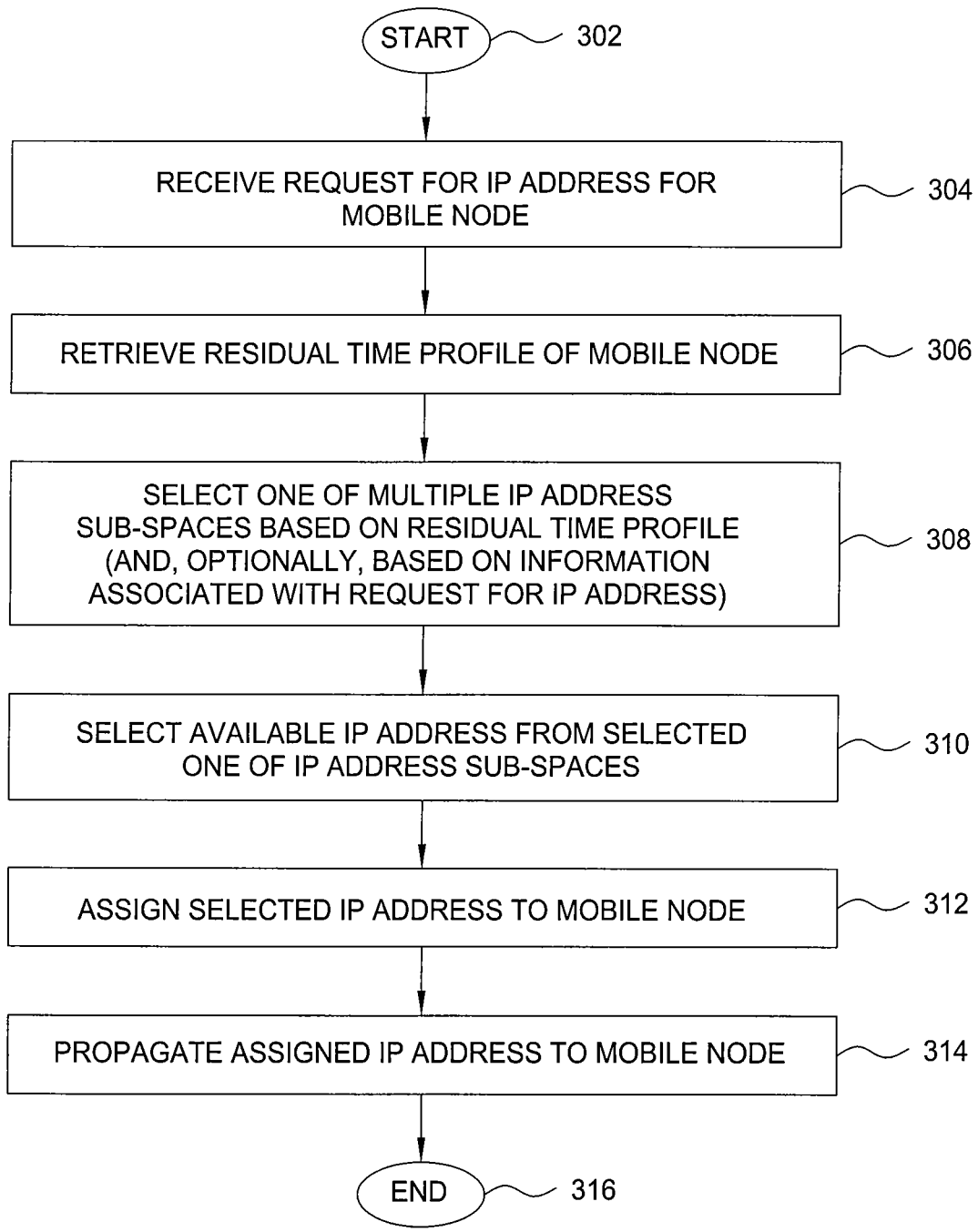
FIG. 3 depicts a method according to one embodiment of the present invention.

FIG. 3 depicts a method according to one embodiment of the present invention. Specifically, method 300 of FIG. 3 includes a method for assigning an IP address to a mobile node from a partitioned IP address space. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a request for an IP address is received. The request for the IP address is received at an address server adapted for serving the request for an IP address (e.g., a HA, a AAA server, a DHCP server, and the like). The request for an IP address is received from a MN (e.g., when the MN requests to be registered with the communication network). The request for an IP address may be received in any form (e.g., a request to register with the network, a request for an IP address from the network, and the like).

The request for the IP address may have information associated with it, which may include information included within the request for the IP address, as well as information determined in response to the request for the IP address. This information may include information similar to information upon which categorization of residual time metrics may be performed (e.g., the point of attachment of the mobile node to the network, the day of the week when the request is received, the time of day when the request is received, and the like, as well as various combinations thereof).

At step 306, a residual time profile of the mobile node is retrieved. The residual time profile of the mobile node may be retrieved from memory (e.g., stored locally on the address server or remotely on one or more other network elements). The residual time profile may be retrieved using one or more identifiers associated with the mobile node. For example, the residual time profile may be retrieved using an NAI of the mobile node, as determined from the request for the IP address, or any other similar identifier by which a mobile node may be identified.

At step 308, one of multiple IP address sub-spaces is selected. The selection of one of the IP address sub-spaces may be performed based on the manner in which the IP address space is partitioned into the IP address sub-spaces. In one such embodiment, the selected IP address sub-space may be selected based on the residual time profile of the mobile node. In another such embodiment, the selected IP address sub-space may be selected based on the residual time profile of the mobile node and information associated with the request for the IP address.

For example, where the IP address space is partitioned into two IP address sub-spaces based on average mobile node residual time (e.g., a first IP address sub-space for average residual time<threshold and a second IP address sub-space for average residual time>threshold), selection of one of the IP address sub-spaces may be performed based on an average residual time statistic from the residual time profile of the mobile node. For example, where residual time profile of the mobile node indicates that the average residual time for IP addresses for the mobile node is greater than the threshold, the second IP address sub-space will be selected as the source of the IP address that is assigned to the mobile node.

For example, where the IP address space is partitioned into two IP address sub-spaces based on average mobile node residual time (e.g., a first IP address sub-space for average residual time<threshold and a second IP address sub-space for average residual time>threshold), selection of one of the IP address sub-spaces may be performed based on a time-of-day-based residual time statistic from the residual time profile of the mobile node and the time of day when the request for the IP address is received from the mobile node. For example, where the request for the IP address is received from the mobile node at 6:30 PM, and the residual time profile of the mobile node indicates that the average residual time for IP addresses requested for the mobile node between 6:00 PM and 11:00 PM is less than the threshold, the first IP address sub-space will be selected as the source of the IP address that is assigned to the mobile node.

The foregoing examples describing selection of an IP address sub-space from which to assign an IP address to a mobile node merely comprise simple examples demonstrating use of different combinations of information (e.g., one or more of information regarding partitioning of an IP address space, information from a residual time profile of a mobile node, and information associated with the request for a mobile node) for determining selection of the IP address sub-space. Those skilled in the art will understand that various other types and combinations of information may be used for selecting an IP address sub-space from which an IP address is selected for assignment to a mobile node.

At step 310, an available IP address is selected from the selected one of the IP address sub-spaces. The selection of the available IP address from the selected one of the IP address sub-spaces may be performed using any algorithm for selecting an IP address from a portion of an IP address space. For example, selection of the available IP address from the selected one of the IP address sub-spaces may be performed using a largest gap first algorithm, a smallest gap first algorithm, and the like, as well as various combinations thereof.

At step 312, the selected IP address is assigned to the mobile node. The selected IP address may be assigned to the mobile node in any manner for assigning an IP address to the mobile node. At step 314, the assigned IP address is propagated to the mobile node. The assigned IP address may be propagated to the mobile node in any manner for providing an assigned IP address to the mobile node to which it is assigned. The mobile node may use the IP address to access various services, such as voice, data, multimedia, and the like, as well as various combinations thereof. At step 316, method 300 ends.

Although primarily depicted and described herein with respect to embodiments in which an IP address space has been partitioned into defined IP address sub-spaces, assignment of an IP address to a mobile node using a residual time profile of the mobile node may also be performed where the IP address space has not been partitioned into IP address sub-spaces. In such embodiments, comparison of residual time statistics in the residual time profile with various thresholds or other values used to evaluate the residual time statistics effectively operate to partition the IP address space into multiple IP address sub-spaces by controlling the portions of the IP address space from which IP addresses are assigned.

For example, where assignment of IP addresses to mobile nodes is performed using an average residual time threshold, when a mobile node requests an IP address the average residual time statistic from the residual time profile of that mobile node is compared to the average residual time threshold in order to determine which IP address should be assigned to the mobile node (i.e., in order to determine which portion of the IP address space the IP address is assigned from). In this manner, partitioning of the IP address space is effected over time as more mobile nodes request IP addresses and are assigned IP addresses based on their respective average residual time statistics.

In such embodiments, the flexibility provided by not performing pre-assignment partitioning of the IP address space enables dynamic partitioning of the IP address space to be performed in real time.

In one embodiment, for example, where assignment of IP addresses to mobile nodes is performed using an average residual time threshold, as mobile nodes are assigned IP addresses from different partitions of the IP address space based on their respective average residual time statistics, if a determination is made that too many IP addresses are being assigned from one partition of the IP address space versus another partition of the IP address space, the average residual time threshold may be dynamically modified in real time in order to control the numbers of IP addresses being assigned from different partitions of the IP address space.

In one embodiment, for example, if a determination is made that too many IP addresses are being assigned from one portion of the IP address space, that portion of the address space may be grown to include adjacent addresses from other address partitions (assuming that those addresses are unused) in order to accommodate the number of requests being received and served from that partition of the address space.

Although not specifically described herein, it should be noted that the partitioning of an IP address space into multiple IP address sub-spaces may implemented as either a hard partition or a soft partition. In one embodiment, where partitioning of an IP address space is a soft partition, if all IP addresses of a specific IP address sub-space are being used, requests for IP addresses that would typically be served from that specific IP address sub-space may be served from any other IP address sub-space, such that the mobile nodes are not prevented from obtaining an IP address for use in communicating over the communication network. In such embodiments, selection of another one of the IP address sub-spaces may be performed in any manner.

Although not specifically described herein, an address server may represent an IP address space using a binary trie (denoted as an address aggregation trie). In such embodiments, profile-based IP address assignment of the present invention may be implemented in a manner for isolating assignment of IP addresses to short-lived MNs from assignment of IP addresses to long-lived MNs. Since aggregated IP addresses that represent long-lived MNs will undergo less change than aggregated IP addresses that represent short-lived MNs, impacts of all changes of IP address assignments on the address aggregation trie (and, thus, on the associated aggregated routing/forwarding table) can be minimized (since such changes only affect a portion of the address aggregation trie).

As described herein, when profile-based IP address assignment is performed by an address server that uses a trie-based representation of the IP address space, the profile-based IP address assignment may be performed in a manner for isolating assignment of IP addresses to short-lived MNs from assignment of IP addresses to long-lived MNs. Since assignment of (and withdrawal of) IP addresses for short-lived MNs results in fluctuations in the size of the address aggregation trie, such isolation ensures that only a portion of the address aggregation trie is subject to such fluctuations, thereby reducing the average size of the address aggregation trie. Similar benefits are realized by partitioning IP address space based on other combinations of parameters/categories.

In IP address assignment algorithms (e.g., the profile-based IP address assignment algorithm, or any other IP address assignment algorithm), the IP address that is assigned to a mobile node is eventually released by the mobile node (e.g., when the mobile node leaves the network). Since the IP address assigned to a mobile node may be released under various conditions (e.g., expectedly, unexpectedly, and the like), the IP address assigned to a mobile node may be released while packets are still in transit to the mobile node. As a result, if a mobile node that is joining the network were to be assigned the newly released IP address of the mobile node leaving the network, any in-transit packets may be delivered to the joining mobile node (i.e., to a mobile node other than the mobile node for which they were intended). This behavior should be avoided at all costs.

In one embodiment, this behavior may be avoided using a hysteresis adaptation, whereby an IP address that is released from one mobile node cannot be assigned to another mobile node until the expiration of a hysteresis time (denoted as T). This prevents rerouting of residual packets from sessions of a first mobile node to a second mobile node when the first mobile node releases its IP address. This hysteresis adaptation to prevent improper delivery of in-transit packets may be implemented in a number of different ways. A method according to one embodiment of the hysteresis adaptation is depicted and described herein with respect to FIG. 4.

Figure 4:
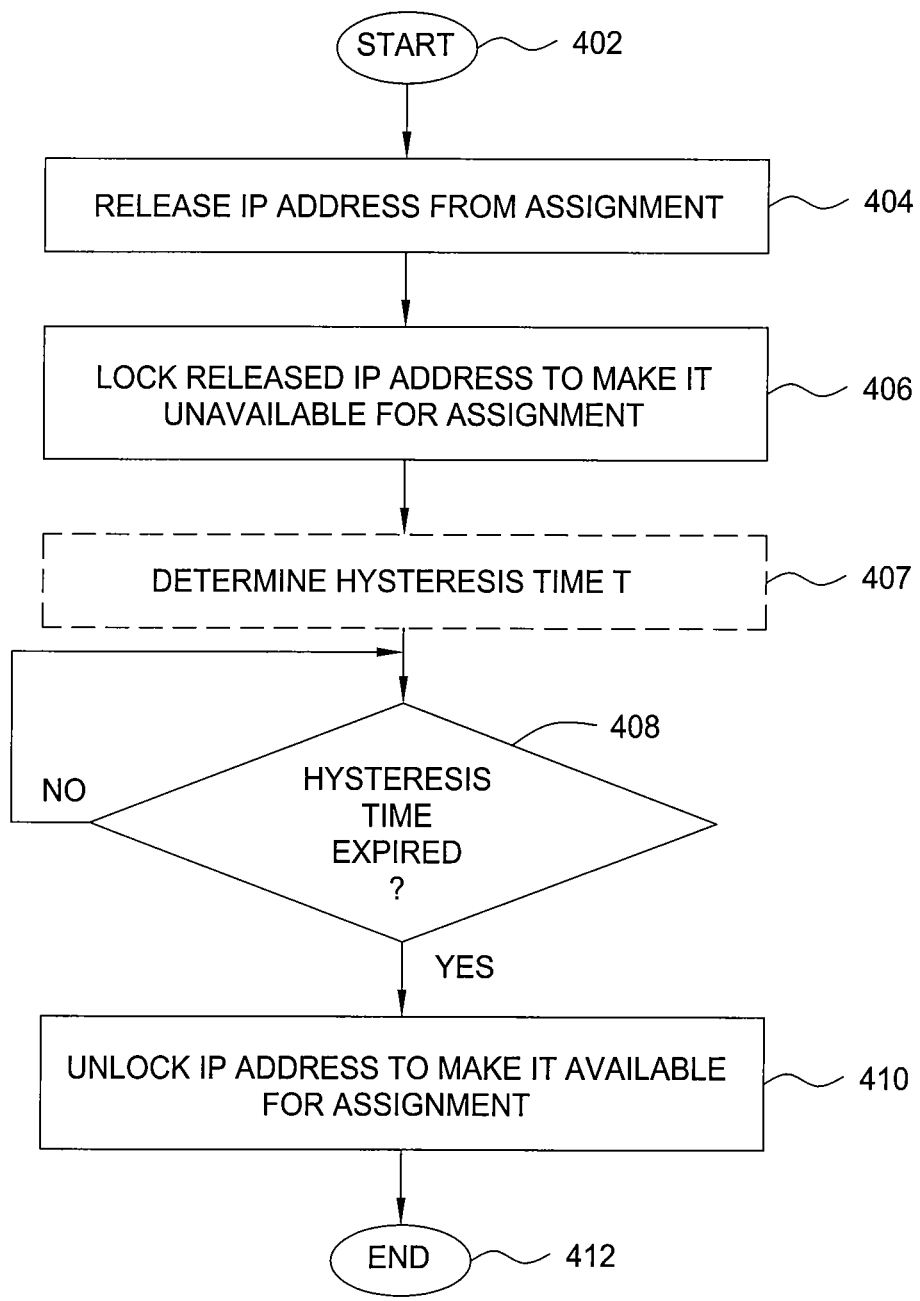
FIG. 4 depicts a method according to one embodiment of the present invention.

FIG. 4 depicts a method according to one embodiment of the present invention. Specifically, method 400 of FIG. 4 includes a method for controlling the availability of an IP address released by a first mobile node for reassignment to a second mobile node. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, an IP address is released from assignment. The IP address is released from assignment to a mobile node to which the IP address was previously assigned. The IP address may be released from assignment in response to many events (e.g., the mobile node leaves the network, the registration of the mobile node with the network expires, and the like). The release of the IP address may be performed in any manner for releasing an IP address.

At step 406, the released IP address is locked to make the IP address unavailable for assignment to another mobile node. The IP address may be locked in any manner (e.g., maintained in a separate list of locked IP addresses instead of a list of IP addresses available for assignment, maintained in a list of IP addresses available for assignment but marked as locked to prevent assignment until the IP address is unlocked, and the like).

At step 407 (an optional step), the hysteresis time (denoted as T) is determined. The hysteresis time is a length of time for which the released IP address will remain locked. In an embodiment in which the hysteresis time is predetermined (e.g., a static hysteresis time T is used), this step is not performed. In an embodiment in which the hysteresis time is not predetermined, this step is performed.

In one embodiment, the hysteresis time T may be determined using some information associated with the mobile node which was previously using the released IP address.

In one embodiment, for example, the hysteresis time may be determined based on the manner in which the mobile node released the IP address. For example, where the release of the IP address was expected (e.g., where the mobile node voluntarily requested release of the IP address, where the registration of the mobile node with the network expired, and the like), an assumption may be made that there is a low probability that packets were in transit when the IP address was released and, thus, the hysteresis time T may be set to a shorter length of time. By contrast, for example, where the release of the IP address was unexpected (e.g., where the mobile node unexpected lost its connection to the network and the like), an assumption may be made that there is a high probability that packets were in transit when the IP address was released and, thus, the hysteresis time T may be set to a longer length of time.

In another embodiment, for example, the hysteresis time may be determined based on the type of application for which the released IP address was being used. For example, where the IP address was being used for an application which typically doesn't have constant transmission of data (e.g., an email application), an assumption may be made that there is a low probability that packets were in transit when the IP address was released and, thus, the hysteresis time T may be set to a shorter length of time. By contrast, for example, where the IP address was being used for an application which typically does have constant transmission of data (e.g., a streaming video application), an assumption may be made that there is a high probability that packets were in transit when the IP address was released and, thus, the hysteresis time T may be set to a longer length of time.

Although primarily depicted and described with respect to specific examples of information associated with the mobile node which was previously using the released IP address that may be used in determining the hysteresis time T, the hysteresis time T may be determined based on any information associated with the mobile node which was previously using the released IP address. For example, the hysteresis time T may be based on information regarding whether or not an application was active at the mobile node when the IP address was released, information regarding whether or not the mobile node had any active sessions when the IP address was released, and the like, as well as various combinations thereof.

The hysteresis time may be based on any other information which may be useful in making an intelligent decision regarding the likelihood that packets were in transit at the time that the IP address was released, the volume of packets that were likely to have been in transit at the time that the IP address was released, and/or any other factors which may be relevant to a decision regarding the length of the hysteresis time T. For example, the hysteresis time T may be based on information about average delays in the network, information about the point of attachment of the mobile node to the network (e.g., via the home network or a foreign network), and the like, as well as various combinations thereof.

At step 408, a determination is made as to whether the hysteresis time T has expired. The determination as to whether the hysteresis time T has expired may be implemented in a number of ways (e.g., using counters, timers, and the like). If the hysteresis time T has not expired, method 400 remains at step 408 (i.e., the hysteresis time T continues to be monitored until it expires). If the hysteresis time T has expired, method 400 proceeds to step 410, at which point the IP address is unlocked to make it available for assignment to another mobile node. At step 412, method 400 ends.

In one embodiment, in which the address server represents the IP address space using a binary trie, hysteresis adaptation may be implemented by maintaining two separate address aggregation tries, one for address aggregation and one for address allocation. In one such embodiment, when the first mobile node releases the IP address, the mobile node is removed from the route entry and a hysteresis timer is started for that leaf node, the leaf counts in the address allocation trie are not updated until the expiration of hysteresis timer (i.e., after T amount of time), at which time the leaf node is deleted and the leaf counts in the address aggregation trie are updated accordingly. The hysteresis adaptation may be implemented using a trie-based representation(s) of the IP address space in various other ways.

Figure 5:
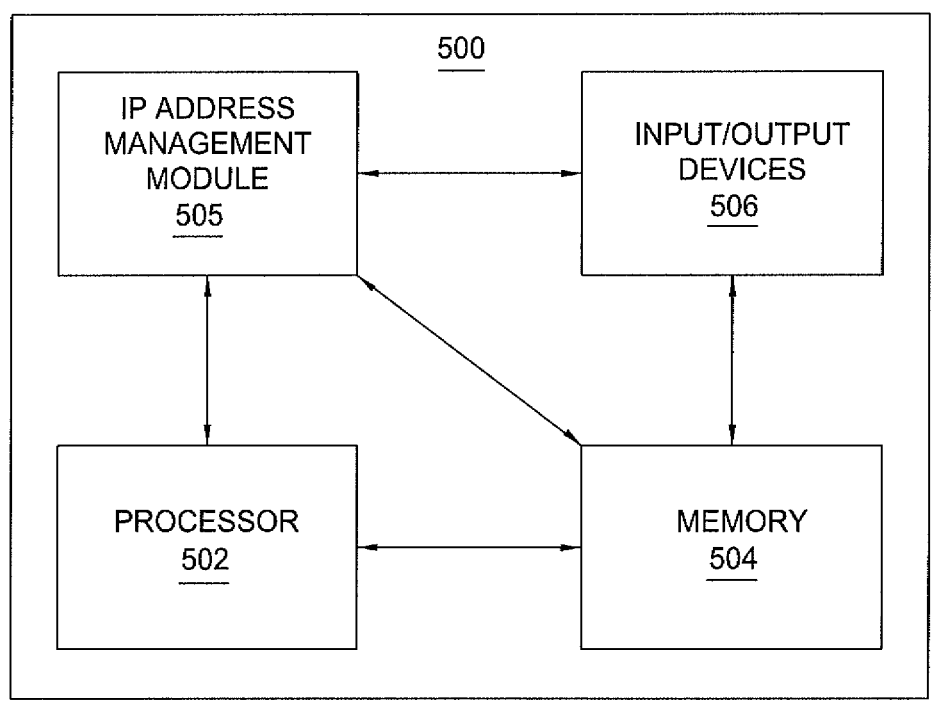
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, system 500 comprises a processor element 502 (e.g., a CPU), a memory 504, e.g., random access memory (RAM) and/or read only memory (ROM), an IP address management module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present IP address management process 505 can be loaded into memory 504 and executed by processor 502 to implement the functions as discussed above. As such, IP address management process 505 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for assigning an Internet Protocol (IP) address to a mobile node (MN) from an IP address space of a mobility network, comprising:

receiving a request for an IP address for the MN;

selecting one of a plurality of IP address sub-spaces of the IP address space using a residual time profile of the MN, wherein the residual time profile comprises a residual time statistic associated with the MN, wherein the residual time statistic is determined using a residual time value indicative of a length of time for which an IP address was assigned to the MN; and assigning, to the MN, an available IP address from the selected IP address sub-space.

2. The method of claim 1, wherein the one of the plurality of IP address sub-spaces is selected using the residual time profile maintained for the MN and information associated with the request for the IP address.

3. The method of claim 1, wherein the residual time statistic comprises one of an average residual time statistic, a minimum residual time statistic, a maximum residual time statistic, and a residual time variance statistic.

4. The method of claim 1, wherein the residual time statistic is categorized in at least one category.

5. The method of claim 4, wherein the at least one category comprises at least one of a point of connection to the network category, an application category, a time of day category, a day of week category, and a day of month category.

6. The method of claim 1, wherein the residual time profile for the mobile node is maintained by monitoring assignment of IP addresses to the mobile node and monitoring release of IP addresses from the mobile node.

7. The method of claim 1, further comprising:
computing the residual time value for the IP address that was assigned to the mobile node; and
updating the residual time profile of the MN to include the residual time value of the IP address that was assigned to MN.

8. The method of claim 1, wherein the plurality of IP address sub-spaces are partitioned from the IP address space using a plurality of residual time profiles of a respective plurality of mobile nodes associated with the mobility network.

9. A method for partitioning an Internet Protocol (IP) address space of a mobility network, comprising:
receiving a plurality of residual time statistics associated with a respective plurality of mobile nodes, wherein, for at least one of the mobile nodes, the residual time statistic of the respective mobile node is determined using a residual time value indicative of a length of time for which an IP address was assigned to the mobile node; and
partitioning the IP address space into a plurality of IP address sub-spaces using at least a portion of the residual time statistics.

10. The method of claim 9, further comprising:
determining the residual time statistics associated with the mobile nodes.

11. The method of claim 10, wherein determining the residual time statistics associated with the mobile nodes comprises:
monitoring management of IP addresses for the mobile nodes.

12. The method of claim 9, wherein, for at least one of the mobile nodes, the residual time statistic associated with the respective mobile node comprises one of an average residual time statistic, a minimum residual time statistic, a maximum residual time statistic, and a residual time variance statistic.

13. The method of claim 9, wherein each residual time statistic is categorized in at least one category.

14. The method of claim 13, wherein the at least one category comprises at least one of a point of connection to the network category, an application category, a time of day category, a day of week category, and a day of month category.

15. The method of claim 9, further comprising:
for each of the mobile nodes, maintaining a respective residual time profile comprising the respective residual time statistic associated with the mobile node.

16. A method for controlling assignment of Internet Protocol (IP) addresses from an IP address space, comprising:
detecting release of an IP address assigned to a mobile node, wherein the released IP address is no longer assigned to the mobile node after being released and is unavailable for use by the mobile node after being released;
locking the released IP address for a length of time, wherein the released IP address is locked in a manner for preventing reassignment of the released IP address to another mobile node, wherein the length of time is a dynamic length of time determined using information associated with the mobile node from which the IP address is released, wherein the information associated with the mobile node from which the IP address is released comprises at least one of a manner in which the IP address is released or a type of an application being used by the mobile node from which the IP address is released; and
after the length of time, unlocking the released IP address such that the released IP address is available for assignment to another mobile node.

17. The method of claim 16, wherein the released IP address is locked and unlocked using a first trie-based representation of the IP address space and a second trie-based representation of the IP address space.

18. The method of claim 16, further comprising:
assigning the IP address to another mobile node.

* * * * *